United States Patent
Joubert et al.

(10) Patent No.: US 7,589,816 B2
(45) Date of Patent: Sep. 15, 2009

(54) DISPLAY DEVICE WITH A BLACK-OPTIMIZING BISTABLE NEMATIC SCREEN AND METHOD FOR THE DEFINITION OF SAID DEVICE

(75) Inventors: Cecile Joubert, Orsay (FR); Daniel Stoenescu, Orsay (FR); Alexandre Carton, Calais (FR); Patrice Davi, Sevres (FR)

(73) Assignee: Nemoptic, Magny les Hameaux (FR)

( * ) Notice: Subject to any disclaimer, the term of this patent is extended or adjusted under 35 U.S.C. 154(b) by 323 days.

(21) Appl. No.: 10/580,319

(22) PCT Filed: Nov. 25, 2004

(86) PCT No.: PCT/FR2004/003022

§ 371 (c)(1),
(2), (4) Date: May 25, 2006

(87) PCT Pub. No.: WO2005/054941

PCT Pub. Date: Jun. 16, 2005

(65) Prior Publication Data

US 2007/0159590 A1    Jul. 12, 2007

(30) Foreign Application Priority Data

Nov. 28, 2003  (FR) ................................ 03 13992

(51) Int. Cl.
  C09K 19/02    (2006.01)
(52) U.S. Cl. ................... 349/180; 349/179; 349/177
(58) Field of Classification Search ............ 349/101, 349/168, 177, 179, 180, 181
See application file for complete search history.

(56) References Cited

U.S. PATENT DOCUMENTS

| 6,327,017 B2 | 12/2001 | Barberi et al. | |
| 7,532,275 B2 * | 5/2009 | Joubert et al. | 349/99 |
| 2003/0076455 A1 | 4/2003 | Kwok et al. | |
| 2007/0103619 A1 * | 5/2007 | Joubert et al. | 349/99 |

FOREIGN PATENT DOCUMENTS

EP    1 026 542    8/2000

(Continued)

OTHER PUBLICATIONS

Bigelow et al., "Observations of a bistable twisted nematic liquid-crystal effect," IEEE Transactions on Electron Devices, vol. 22, Issue 9, Sep. 1975, pp. 730-733.*

(Continued)

*Primary Examiner*—Uyen Chau N Le
*Assistant Examiner*—Rhonda S Peace
(74) *Attorney, Agent, or Firm*—Young & Thompson

(57) ABSTRACT

A device nematic liquid crystal display device has two stable states corresponding to two liquid crystal molecule textures whose torsion differs by 150° to 180° in terms of absolute value. The device includes two polarizers (10, 40), one (10) of which is placed on the observer side, the other (40) being placed on the opposite side of the liquid crystal cell. The orientation of the two polarizers is offset by a value which is equal to the rotatory power of the cell+/−Π/2, the rotatory power corresponding to the most twisted texture effect.

30 Claims, 9 Drawing Sheets

FOREIGN PATENT DOCUMENTS

FR          2740894          1/1998

OTHER PUBLICATIONS

Yeung et al., "Truely bistable twisted nematic liquid crystal display," Proceedings of the Sixth Chinese Symposium, Sep. 12-14, 2003, pp. 225-227.*

Yamaguchi et al., "measurement of twist angle distribution and an azimuthal anchoring energy by Stokes Parameter Method (SPM)," Proceedings of the Fifth Asian Symposium Information Display, 1999, Mar. 17-19, 1999, pp. 181-184.*

Zhuang et al., "Parameter optimization for a reflective bistable twisted nematic display by use of the Poincare sphere method," Optics Letters, vol. 24, No. 16, Aug. 15, 1999, pp. 1166-1168.*

Zhuang et al., "Optimized configuration for reflective bistable twisted nematic displays," Applied Physics Letters, vol. 75, No. 9, Aug. 30, 1999, pp. 1225-1227.*

Ong, "Origin and characteristics of the optical properties of general twisted nematic liquid-crystal displays," *Journal of Applied Physics*, vol. 64, No. 2, Jul. 15, 1988, pp. 614-628.

Martinot-Lagarde et al., "5.4: Fast Bistable Nematic Display Using Monostable Surface Anchoring Switching," *SID 97 Digest*, pp. 41-44.

Dozov et al., "Fast bistable nematic display from coupled surface anchoring breaking," *SPIE*, vol. 3015, pp. 61-69.

Ong, "Origin and characteristics of the optical properties of general twisted nematic liquid-crystal displays," Journal of Applied Physics, vol. 64, No. 2, Jul. 15, 1988, pp. 614-628.

Dozov et al., "16.1: Recent Improvements of Bistable Nematic Displays Switched By Anchoring Breaking (BiNem®)," *SID 01 Digest*, pp. 224-227.

Zhuang et al., "Bistable twisted nematic liquid-crystal optical switch," *Applied Physics Letters*, vol. 75, No. 19, Nov. 8, 1999, pp. 3008-3010.

Zhuang et al., Applied Physics Letters, vol. 75, No. 19. pp. 3008-3010, Nov. 8, 1999(XP-000 875 975).

Martinot-Lagarde et al., Liquid Crystal Materials, Devices and Applications XI, Liang-Chy Chien, editor, SPIE-IS&T Electronic Imaging, SPEI vol. 5003, pp. 25-34, 2003, (XP-002 317 405).

Qian et al., "Dynamic flow, broken surface anchoring, and switching bistability in three-terminal twisted nematic liquid crystal displays", Journal of Applied Physics, vol. 90, No. 6, pp. 3121-3123 (2001).

Guo et al., "Three terminal bistable twisted nematic liquid crystal displays", Applied Physics letters, vol. 77, No. 23, pp. 3716-3718, Dec. 2000.

* cited by examiner

FIG.2
2a
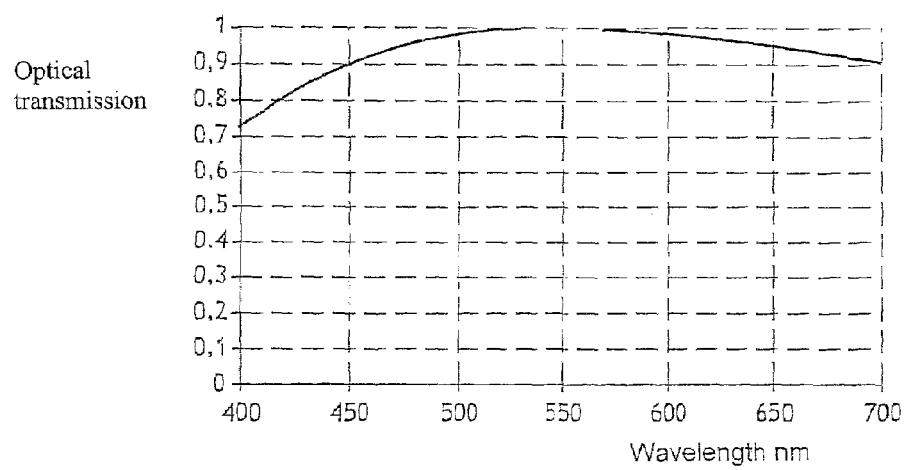
2b
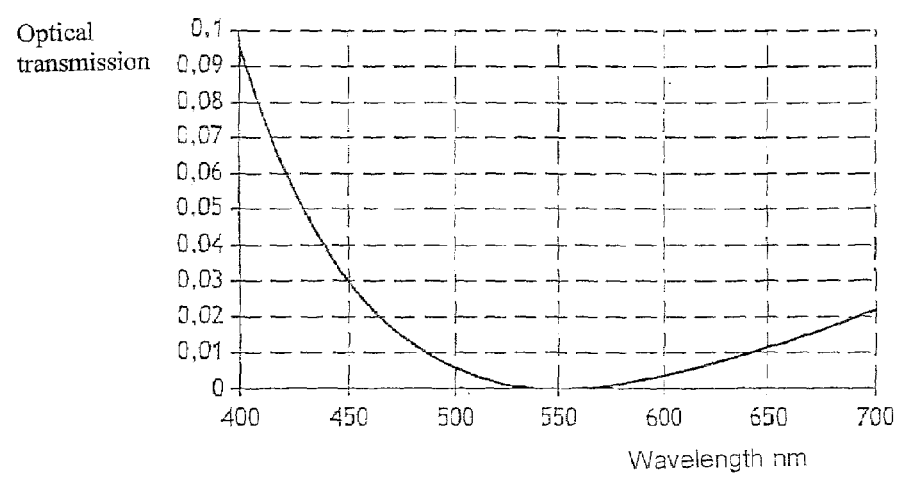

FIG.5
5a
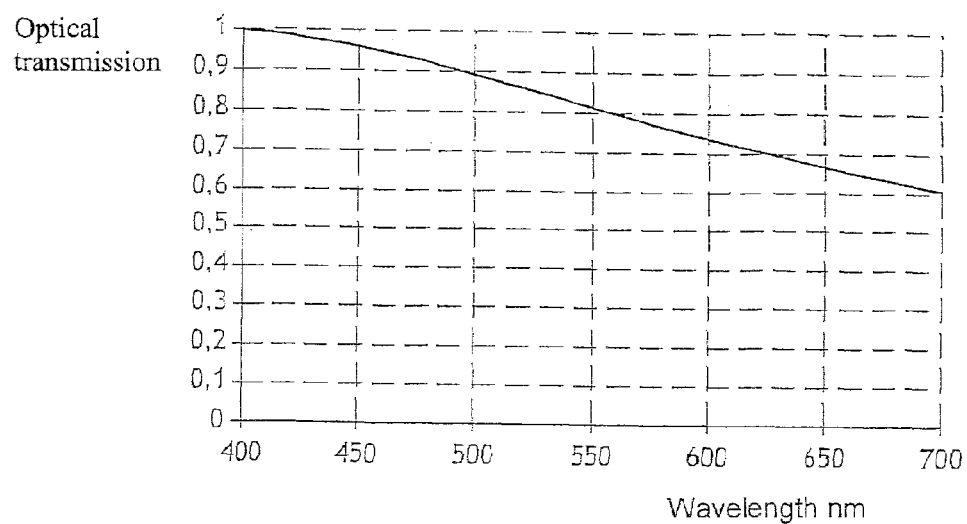
5b
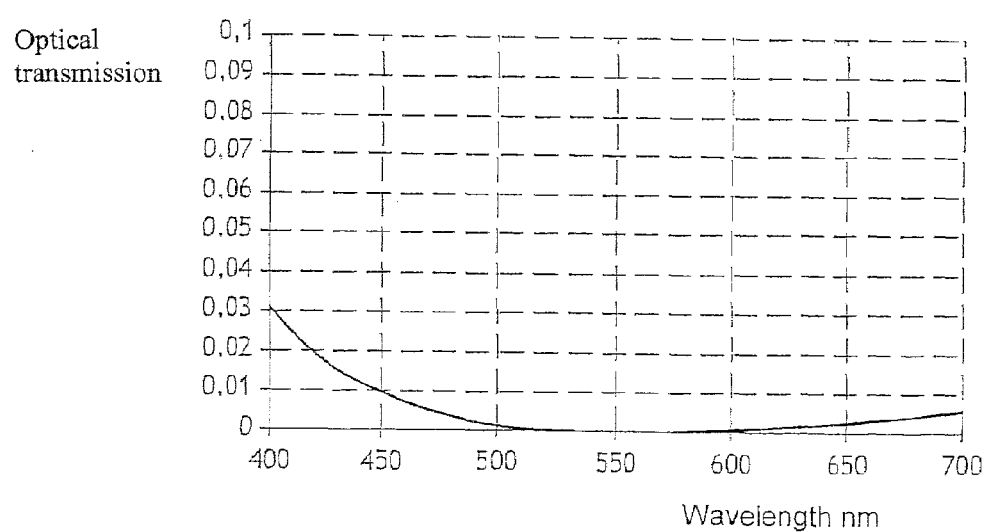

FIG.9
9a
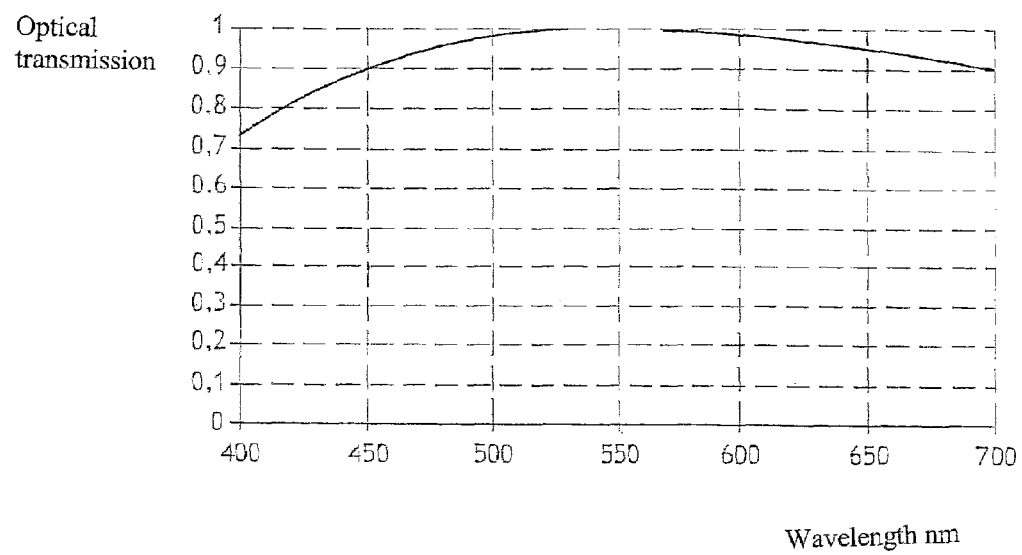
Wavelength nm
9b
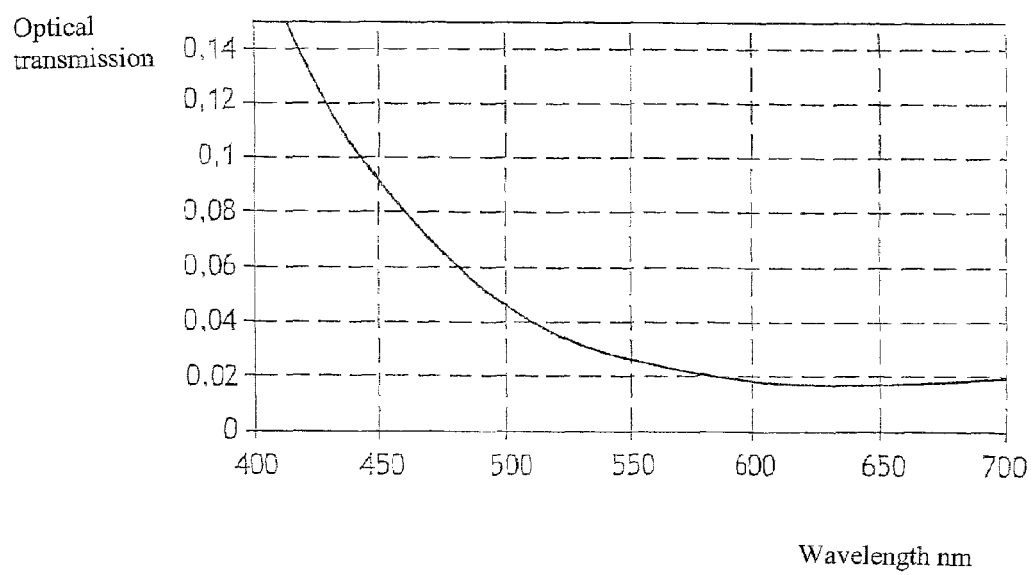
Wavelength nm

FIG.10
10a
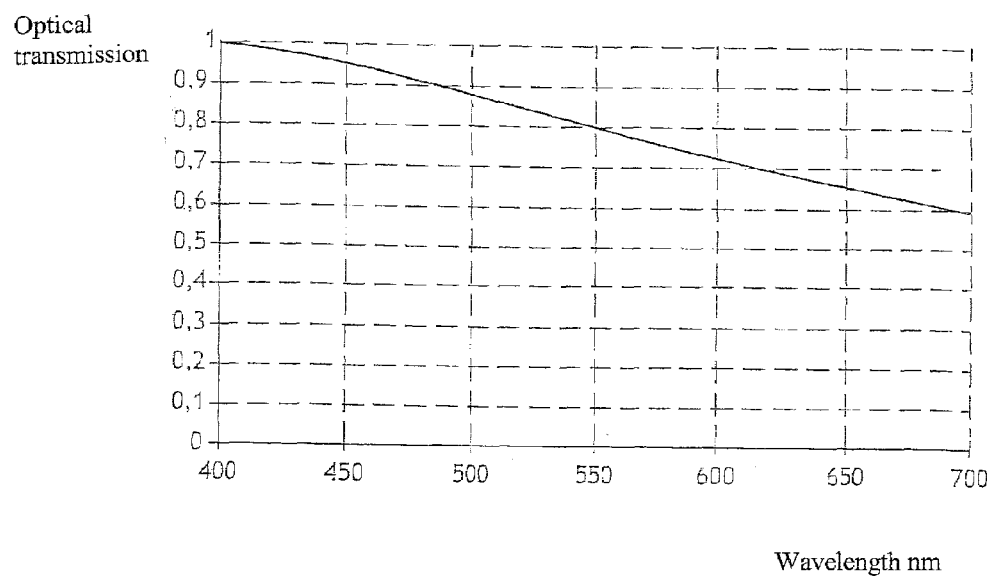
10b
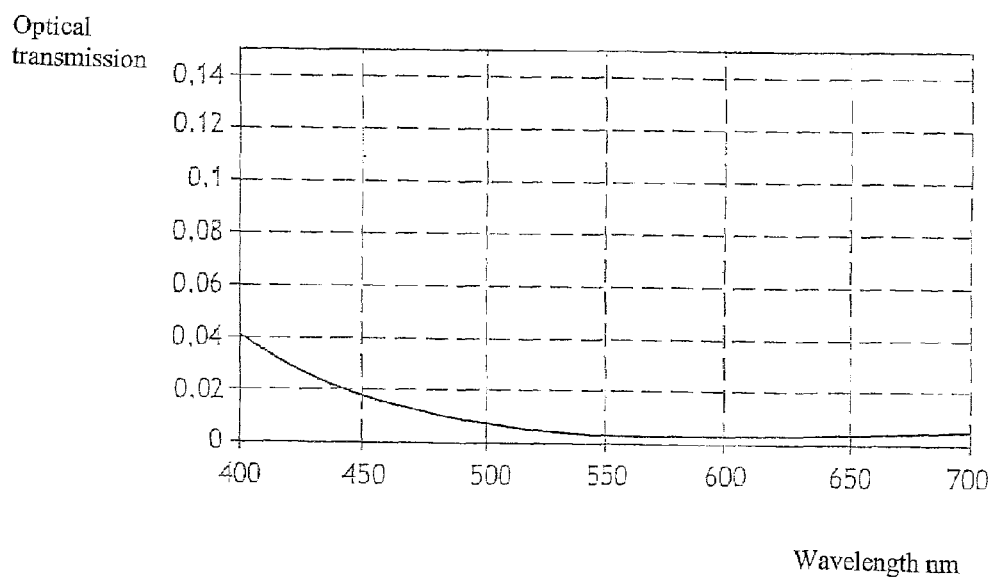

DISPLAY DEVICE WITH A BLACK-OPTIMIZING BISTABLE NEMATIC SCREEN AND METHOD FOR THE DEFINITION OF SAID DEVICE

FIELD OF THE INVENTION

This is a 371 National Stage application of International application no. PCT/FR2004/003022, filed Nov. 25, 2004, which claims priority to French application no. 03/13992, filed Nov. 28, 2003. The entire contents of the abovereferenced applications are hereby incorporated by reference in their entirety.

This invention relates to the field of liquid crystal display devices and more precisely the optical configuration of a bistable nematic display operating according to an optical mode which optimizes the black state of this display.

AIM OF THE INVENTION

The aim of this invention is to obtain a bistable display with a very good-quality black state, i.e. a display having in this state a very low optical transmission, taking account of certain stresses likely to be imposed on the cell.

Generally, the optical mode for which the quality of the black is preponderant is the transmissive mode, but the optical configurations calculated here also make it possible to produce a screen operating according to a transflective or reflective mode.

STATE OF THE ART

Bistable Liquid Crystal Display Switching Between two Textures Differing by 180°

The type of bistable liquid crystal display considered in this invention is a display which switches between two textures, that are stable without an applied electric field (from whence its bistability), different from each other by an angle of $\pi$. For one of the textures, the angle $\phi_U$ formed by the liquid crystal molecule directors on the two surfaces of the cell is of the order of 0 to ±20°. The molecules remain virtually parallel between themselves, and this texture will be called U. The second texture T has a twist angle $\phi_T = \phi_U \pm \pi$. The molecules carry out, in this texture T, a rotation of approximately ±180° (±20°) between the two surfaces of the cell.

The nematic liquid crystal is chiralized so as to present a spontaneous pitch $p_0$ close to four times the thickness d of the cell, in order to equalize the energies of the two textures. The ratio between the thickness d of the cell and the spontaneous pitch $p_0$, i.e. $d/p_0$, is therefore approximately equal to 0.25±0.1, preferably 0.25±0.005. Without an electric field, they are the states of minimal energy.

To date two displays using this principle have been described.

Document [1] describes a display which carries out switching between the two textures U and T by applying an electric field pulse of specific shape. This display is based on a break of the a zenithal anchoring of the liquid crystal molecule on one of the alignment surfaces (documents [2] and [3]), i.e. the molecule is raised by the electric field before falling back on one side or the other, thus allowing the two textures U and T to be obtained. In this case, the structure of the electrodes necessary for the application of the field is standard, identical to that used for the liquid crystal displays of TN or STN type. This display is generally called BiNem®.

Document [4] describes a display which also uses an anchoring break and a specific type of electrode (called "comb shaped electrodes"), making it possible to obtain a lateral component of the electric field, i.e. parallel with the substrate. Switching between the two textures is carried out in this case by an effect qualified by the author as azimuthal anchoring break (documents [5] and [6]).

The switching method is not essential to this invention. In fact whatever the switching mode (zenithal or azimuthal anchoring break), the textures of the liquid crystal molecules are the same, the switching taking place between two twisted textures, one texture with a low twist angle $\phi_U$ and called U, and the other texture with a high twist angle $\phi_T = \phi_U \pm \pi$ and called T. And the optical behaviour of the display depends only on the textures of the liquid crystal molecules.

Optical Modes of Such Displays

FIG. 1, attached, shows diagrammatically a liquid crystal display of the type described previously, to which the present invention can be applied.

This display comprises:
- an analyser polarizer 10 on the side of the observer,
- two plates 20, 30 confining the nematic liquid crystal molecules separated by a distance d, and
- a polarizer 40 arranged on the rear of the display, i.e. on the opposite side with respect to the observer.

An orthonormalized reference x', y', z' is represented in FIG. 1, the directions x' and y' of which define a plane perpendicular to the direction of propagation of the light rays and z' is parallel to this direction of propagation.

The nematic director of the molecules on the plate 20, (i.e. the anchoring direction on this plate 20) is referenced 22. The nematic director on the plate 30 is referenced 32.

The anchorings on the plates 20 and 30 are adapted to allow switching of the nematic liquid crystal molecules between two respectively stable states U and T, which differ from one another by a twist of the order of $\pi$, by the application of electrical signals applied to electrodes provided on the plates 20 and 30 according to the known modalities described in the documents mentioned previously.

Such a cell is characterized by:
- its delay $\Delta nd$, which is a product of the difference of the indexes $\Delta n$ of the liquid crystal and the thickness d of the cell,
- its twist $\phi$,
- the angles P and A formed respectively by the P input or rear polarizer 40 and the A output or analyzer polarizer 10 (analyser) with a fixed reference (which according to FIG. 1 arbitrarily coincides with the x' axis).

The output polarizer 10, situated on the side of the observer is always of transmissive type. The optical mode is determined by the nature of the rear polarizer 40:

In purely transmissive mode, the screen operates as a transparency, the optical architecture is: source-screen-observer. The polarizer 40 is of transmissive type.

In transflective mode, the polarizer 40 is transflective, i.e. partially reflecting: part of the polarized light is transmitted, the other part is reflected. This allows the screen to operate either in transmissive mode when it is illuminated by a rear source, or in reflective mode using ambient light as a source of light when it is not back-lighted.

In reflective mode, the polarizer 40 is of reflective type. The screen is then exclusively illuminated by the ambient light reflected by this polarizer 40.

Documents [4] and [6] calculate a transmissive optical mode for a precise wavelength making it possible to simultaneously obtain for this wavelength (for example 550 nm), an optical transmission T=0 for one of the two textures (black state) and an optical transmission T=1 for the other texture. By calculation, the authors obtain several sets of values of the characteristics of the cell (Δnd, φ, P and A). All of the values corresponding to the shortest optical delay Δnd are shown in Table 1, attached.

This calculation of the optimal values is carried out using the analytical form of the optical transmission of a liquid crystal cell as a function of the parameters Δnd, φ, P and A, given in numerous publications (documents [7] or [8] for example).

The formula given in document [8] is the following:

$$T(\phi, \lambda) = \cos^2(\alpha + \beta) - \cos^2 X \cos 2\alpha \cos 2\beta \left[\frac{\phi}{X}\tan X - \tan 2\alpha\right]\left[\frac{\phi}{X}\tan X - \tan 2\beta\right] \quad [1]$$

with $$X(\phi, \lambda) = \sqrt{\phi^2 + \left(\frac{\pi \Delta nd}{\lambda}\right)^2} \quad [2]$$

In this formula α and β are the angles formed by the polarizer 40 and the analyser 10 respectively with the liquid crystal director 32, 22 respectively situated on the same side.

Let $\phi_P$ and $\phi_A$ be the angles formed by the directors 32 and 22 with the x' axis of the reference x'y'z'.

Then: P=α+$\phi_P$ and A=β+$\phi_A$ (see FIG. 1)

The value of the twist of the liquid crystal cell texture is obtained by doing the difference between the director 22 of the liquid crystal on one of the faces of the cell and the director 32 on the other face: φ=$\phi_A$−$\phi_P$ Formula [1] can also be obtained as a function of A and P instead of α and β. In order to simplify the notations we will take the liquid crystal director 32 on the polarizer 40 side along x' i.e. $\phi_P$=0 and $\phi_A$=φ, hence:

P=α and A=β+φ

The authors of documents [4] and [6] are researching, for a given wavelength, the conditions which annul the transmission, then for the twist increased by π the conditions which make it possible to obtain the maximal value of 1. The delay Δnd taken for the two calculations must of course be the same. The respective transmissions of the white and black states thus obtained are given in FIG. 2, attached, as a function of the wavelength.

The value of the normalized luminances of the black state and of the white state calculated over all of the visible spectrum, are also shown in Table 1 as well as the contrast CR ratio of the two luminances. These values make it possible to compare the configurations proposed according to the state of the art and those proposed within the scope of this invention.

The normalized luminances are calculated as follows:

$$L = \frac{\int T(\lambda)\bar{y}(\lambda)s(\lambda)d\lambda}{\int \bar{y}(\lambda)s(\lambda)d\lambda}$$

with T(λ) the optical transmission of the liquid crystal cell, $\bar{y}(\lambda)$ the sensitivity of the eye and s(λ) the spectrum of the illumination source, which is assumed to be constant and equal to 1 (so-called "flat" spectrum).

This mode of calculation is carried out based on the principle that points are sought which simultaneously verify the perfect black and the perfect white for the 2 textures differing by π, at a fixed wavelength, and all the cell parameters are free.

DESCRIPTION OF THE INVENTION

The inventors propose a different process which makes it possible to obtain for a cell [($\phi_U$; $\phi_T$], an optical mode possessing a very good black, and which take account of certain industrial constraints.

The inventors propose, more precisely, to apply this process to a real cell, i.e. taking account of a so-called "finite" azimuthal anchoring (i.e. not infinitely strong), for example on one of the alignment layers. In this case the two textures differ by an angle of slightly less than π.

This invention thus proposes a nematic liquid crystal display device presenting two stable states, without an electric field, that are obtained by anchoring break, characterized by the fact that it comprises two polarizers, the first polarizer being placed on the side of the observer, the other polarizer being placed on the opposite face of the liquid crystal cell, the orientation of the two polarizers being shifted by a value equal to the rotatory power of the cell ±π/2, the rotatory power corresponding to the effect of the most twisted texture.

According to other advantageous characteristics of this invention:

the optical delay Δnd is of the order of 240±80 nm,
the optical delay Δnd is of the order of 210±50 nm,
the orientation of the polarizer placed on the opposite side with respect to the observer, as referring to the nematic director on the associated face of the cell, is comprised within the range containing the sub-range ±(20° to 70°) whilst the orientation of the polarizer placed on the side of the observer, as referring to the same nematic director reference, is comprised within the range comprising the sub-range from ±(20° to 70°),
for a levo-rotatory liquid crystal, the orientation of the polarizer placed on the opposite side with respect to the observer is comprised within the range comprising the sub-ranges −70° to −40° and 20° to 55° whilst the orientation of the polarizer placed on the side of the observer is comprised within the range comprising the sub-ranges −55° to −20° and 35° to 70°, and for a dextro-rotatory liquid crystal, the orientation of the polarizer placed on the opposite side with respect to the observer is comprised within the range comprising the sub-ranges −55° to −20° and 40° to 70° whilst the orientation of the polarizer placed on the side of the observer is comprised within the range comprising the sub-ranges −70° to −35° and 20° to 55°,
the twist angle of the molecules in one of the two stable states is comprised between 0° and 15°,
the twist angle of the molecules in one of the two stable states is comprised between 0° and 15°, the optical delay Δnd=200±40 nm and for a levo-rotatory liquid crystal, the orientation of the polarizer on the opposite side with respect to the observer is comprised within the range [−60°; −40°] U [30°; 50°], whilst the orientation of the polarizer on the side of the observer is comprised within the range [−50°; −25°] U [40°; 70°],
the twist angle of the molecules in one of the two stable states is comprised between 0° and 15°, the optical delay Δnd=200±40 nm and for a dextro-rotatory liquid crystal, the orientation of the polarizer on the opposite side with respect to the observer is comprised within the range [−50°; −30°] U [40°; 60°], whilst the orientation of the polarizer on the side of the observer is comprised within the range [−70°; −40°] U [25°; 50°], the twist angle of the molecules in one of the two stable states is comprised between 0° and 15°, the optical delay Δnd=280±40 nm and for a levo-rotatory liquid crystal, the orientation of the polarizer on the opposite side with respect to the observer is comprised within the range [−65°; −45°] U [25°; 50°], whilst the orientation of the polarizer on the side of the observer is comprised within the range [−50°; −20°] U [40°; 70°], the twist angle of the molecules in one of the two stable states is comprised between 0° and 15°, the optical delay Δnd=280±40 nm and for a dextro-rotatory liquid crystal, the orientation of the polarizer on the opposite side with respect to the observer is comprised within the range [−50°; −25°] U [45°; 65°], whilst the orientation of the polarizer on the side of the observer is comprised within the range [−70°; −40°] U [20°; 50°], the angle formed by the brushing directions between themselves is comprised between 10° and 15°, the optical delay Δnd=200±40 nm and for a levo-rotatory liquid crystal, the orientation of the polarizer on the opposite side with respect to the observer is comprised within the range [−55°; −35°] U [35°; 55°], preferentially [−40°; −50°] U [40°; 50°], whilst the orientation of the polarizer on the side of the observer is comprised within the range [−45°; −25°] U [45°; 70°], preferentially [−45°; −25°] U [50°; 65°], the angle formed by the brushing directions between themselves is comprised between 10° and 15°, the optical delay Δnd=200±40 nm and for a dextro-rotatory liquid crystal, the orientation of the polarizer on the opposite side with respect to the observer is comprised within the range [−35°; −55°] U [35°; 55°], preferentially [−40°; −50°] U [40°; 50°], whilst the orientation of the polarizer on the side of the observer is comprised within the range [−70°; −45°] U [25°; 45°], preferentially [−65°; −50°] U [25°; 45°], the angle formed by the brushing directions between themselves is comprised between 0° and 10°, the optical delay Δnd=200±40 nm and for a levo-rotatory liquid crystal, the orientation of the polarizer on the opposite side with respect to the observer is comprised within the range [−65°; −40°] U [25°; 50°], preferentially [−60°; −45°] U [30°; 45°], whilst the orientation of the polarizer on the side of the observer is comprised within the range [−55°; −25°] U [35°; 65°], preferentially [−50°; −30°] U [40°; 60°], the angle formed by the brushing directions between themselves is comprised between 0° and 10°, the optical delay Δnd=200±40 nm and for a dextro-rotatory liquid crystal, the orientation of the polarizer on the opposite side with respect to the observer is comprised within the range [−50°; −25°] U [40°; 65°], preferentially [−45°; −30°] U [45°; 60°], whilst the orientation of the polarizer on the side of the observer is comprised within the range [−65°; −35°] U [25°; 55°], preferentially [−60°; −40°] U [30°; 50°], the angle formed by the brushing directions between themselves is comprised between 0° and 5°, the optical delay Δnd=280±40 nm and for a levo-rotatory liquid crystal, the orientation of the polarizer on the opposite side with respect to the observer is comprised within the range [−70°; −45°] U [20°; 45°], preferentially [−65°; −50°] U [25°; 40°], whilst the orientation of the polarizer on the side of the observer is comprised within the range [−50°; −25°] U [40°; 65°], preferentially [−45°; −30°] U [45°; 60°], the angle formed by the brushing directions between themselves is comprised between 0° and 5°, the optical delay Δnd=280±40 nm and for a dextro-rotatory liquid crystal, the orientation of the polarizer on the opposite side with respect to the observer is comprised within the range [−45°; −20°] U [45°; 70°], preferentially [−40°; −25°] U [50°; 65°], whilst the orientation of the polarizer on the side of the observer is comprised within the range [−65°; −40°] U [25°; 50°], preferentially [−60°; −45°] U [30°; 45°].

This invention also proposes a method for the optimization of the orientation of two polarizers in a nematic liquid crystal display device presenting two stable states by anchoring break, characterized by the fact that it comprises the steps consisting of calculating the rotatory power of the cell and positioning the two polarizers, the first polarizer being placed on the side of the observer, the other polarizer being placed on the opposite face of the liquid crystal cell, according to an orientation shifted by a value equal to the rotatory power of the cell ±π/2, the rotatory power corresponding to the effect of the most twisted texture.

According to other advantageous characteristics of the process of this invention:

the rotatory power PR is calculated on the basis of the relationship:

$$PR \cong \phi - \arctg\left(\frac{\phi}{X} tg X\right) \quad [3]$$

with $$X(\phi, \lambda) = \sqrt{\phi^2 + \left(\frac{\pi \Delta nd}{\lambda}\right)^2} \quad [2]$$

the process comprises the steps consisting of:

calculating the rotatory power PR using a formula which utilizes the optical delay Δnd, the twist φ and the wavelength λ, fixing the orientation A of the output polarizer (10) equal to P+PR±π/2, P representing the orientation of the polarizer (40) on the opposite side with respect to the observer and PR the rotatory power, researching the values of P which produce the highest resultant transmission value for the twist value of the order of φ±π and deducing A from it.

the transmission value is defined by the relationship:

$$Tas(\phi, \lambda) = \quad [1]$$
$$\cos^2(\alpha + \beta) - \cos^2 X \cos 2\alpha \cos 2\beta \left[\frac{\phi}{X}\tan X - \tan 2\alpha\right]\left[\frac{\phi}{X}\tan X + \tan 2\beta\right].$$

the rotatory power PR is calculated on the basis of an optimal twist value φopt determined on the basis of the relationship:

$$\phi_{opt} = \pi \sqrt{1 - \left(\frac{\Delta nd}{\lambda_0}\right)^2} \quad [6]$$

the rotatory power PR is calculated on the basis of a twist value imposed by the azimuthal anchoring.

the method comprises a step of adaptation of the angles of the polarizers in order to improve the colorimetric neutrality of the white obtained.

the rotatory power PR is calculated on the basis of a twist value which integrates an uncoupling (DE) resulting from a finite azimuthal anchoring.

Other characteristics, aims and advantages of this invention will become apparent on reading the detailed description which follows, and with reference to the attached drawings, given as non-limitative examples and in which:

BRIEF DESCRIPTION OF THE DRAWINGS

FIG. 2 represents the respective transmissions for white (FIG. 2a) and black (FIG. 2b) states obtained using a device according to the present invention, as a function of the wavelength, FIG. 3 diagrammatically represents the angles ψ and w characteristic of an elliptical polarization, FIG. 5 represents the optical transmission of the configuration (Δnd=193 mm) described in Table 2 as a function of the wavelength, respectively for the white state in FIG. 5a and for the black state in FIG. 5b, FIG. 6 diagrammatically represents the brushing directions on the analyser and polarizer side and the orientations of the liquid crystal molecules on the alignment layers for the case of an infinitely strong azimuthal anchoring, FIG. 9 represents the optical transmission of the configuration (Δnd=275 mm, φ imposed at φu=0° and φT=−180°) described in Table 3 as a function of the wavelength, respectively for the white state in FIG. 9a and for the black state in FIG. 9b, FIG. 10 represents the optical transmission of the configuration (Δnd=193 mm, φ imposed at φu=0° and φT=−180°) described in Table 3 as a function of the wavelength, respectively for the white state in FIG. 10a and for the black state in FIG. 10b, FIG. 11 diagrammatically represents a similar view to FIG. 3 for the case of a finite azimuthal anchoring on the plate of the cell situated on the side of the analyser.

DETAILED DESCRIPTION OF THE INVENTION

The optimization calculations are carried out hereafter for the transmissive mode. However, this invention is directly applicable to the production of transflective or reflective screens, the only difference being the nature of the rear polarizer 40, all else being equal.

Calculation Process for the Optimization of the Transmissive Mode of a Cell [φ$_U$; φ$_T$]

Firstly, what characterizes the performance of a transmissive mode is the quality of its black. The optimization of the black state must therefore be carried out not only over a single wavelength but over the whole of the visible spectrum. The condition T=1 for the white state at a fixed wavelength is not necessary, the screen being illuminated by a rear source, a loss on the white state is acceptable, provided that it is not too great.

The process followed by the inventors consists of calculating the optimum mode producing the best black for several delay values Δnd. The delay value finally chosen will depend on the desired compromise between the quality of the black and the quality of the white.

The texture T is more optically stable than the texture U, it is therefore chosen by the inventors in order to obtain the black.

Characteristics of the Polarization After Passing Through the Liquid Crystal Layer The inventors use the Poincaré formalism, which describes the different possible polarization states as well as the evolution of the polarization during its propagation in the cell by a plot on a sphere called a Poincaré sphere (see documents [9] or [10]).

This very powerful tool for those who can visualize in three-dimensional space allows a better comprehension of the optical effect of the liquid crystal cell for the highly twisted texture (twist of the order of π) which is used for the black in the transmissive mode.

The principal result obtained thanks to this tool is that the texture T (twist (φ$_T$ of the order of π) is, for cell delays Δnd less than or equal to λ/2 (λ representing a wavelength of the visible spectrum), equivalent to a virtually perfect rotatory power PR. This signifies that whatever the input polarization angle P, the output polarization Pout is weakly elliptical (nearly linear) and the major axis of this ellipse forms an angle PR with respect to P.

Figure 1:
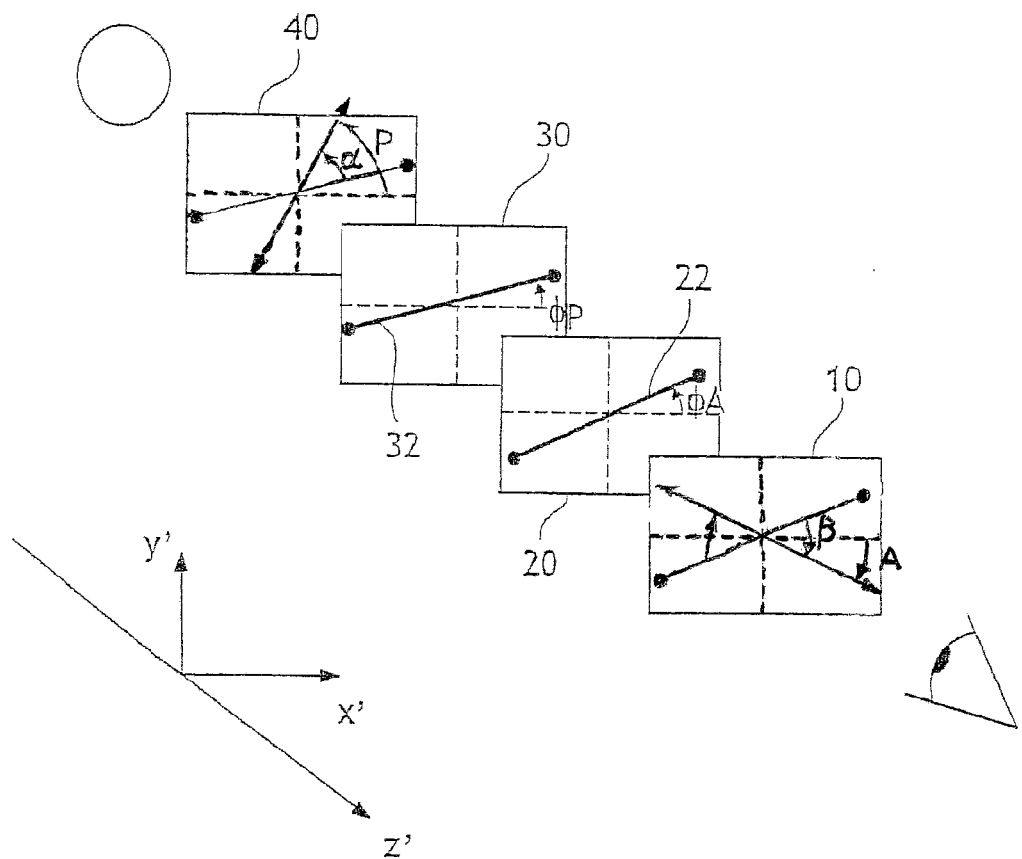
FIG. 1 diagrammatically represents a liquid crystal cell applicable to this invention and defines the angles used in the rest of the description.
Figure 3:
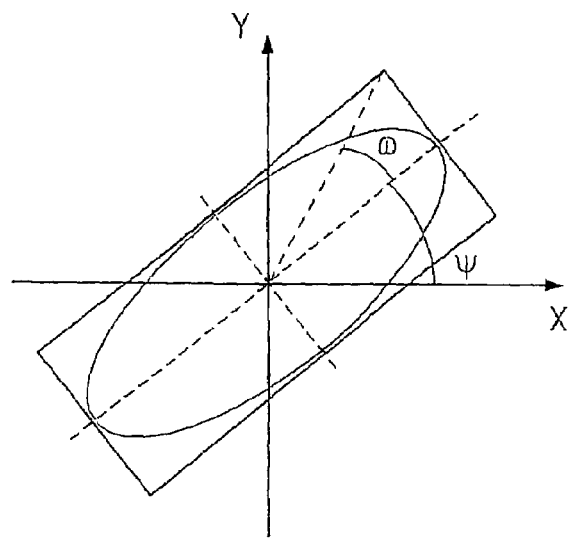

The output polarization Pout, which is a priori any polarization and thus elliptical, can be characterized by 2 angles ψ and ω. ψ is the angle formed by the major axis of the ellipse with x' and ω characterizes the ellipticity of the polarization as illustrated in FIG. 3.

We have ψ=P+PR

Thanks to the Poincaré sphere it is also possible to obtain the analytical form of PR (approximate value) and ω.

$$PR \cong \phi - \arctg\left(\frac{\phi}{X} tgX\right) \quad [3]$$

$$\sin 2\omega = 2 \sin\eta \sin X (\cos 2\alpha \cos\eta \sin X + \sin 2\alpha \cos X) \quad [4]$$

with $\cos\eta = \frac{\phi}{X}$.

Formula [3] is valid as a first approximation, when X is close to π, which is always true in the cases dealt with within the scope of this invention.

Annulation of the ellipticity ω is equivalent to obtaining at the cell output a linear polarization, i.e. a configuration where a perfect black or a white can be obtained with the analyser.

The fact that formula [3] makes it possible to predict the value of the rotatory power makes it possible to calculate the angle ψ of the output polarization Pout. The configuration A for the analyser 10 producing the best black for a given orientation P of the polarizer 40 is A perpendicular to ψ.

i.e. $A = P + PR \pm \pi/2$ [5]

The condition which annuls the ellipticity ω is $$X = \pi \cdot \text{i.e:}$$

$$\phi_{opt} = \pi \sqrt{1 - \left(\frac{\Delta nd}{\lambda_0}\right)^2} \quad [6]$$

Thus when X is fixed, there exists a relationship between φ and Δnd making it possible to obtain a linear output polarization Pout, which guarantees the obtaining of a perfect black at a given λ, with the analyser 10 perpendicular to the output polarization. The value of φ calculated with formula [6] for a given delay Δnd will be called $\phi_{opt}$.

The optimal configuration is calculated for a cell delay Δnd and a given wavelength λ.

The procedure for calculating the best configuration within the scope of this invention is preferably the following:

Case Where the Parameter φ is Free

Formula [6] makes it possible to calculate the optimal φ value, $\phi_{opt}$, for the chosen delay.

Optimization of the Black

Figure 4:
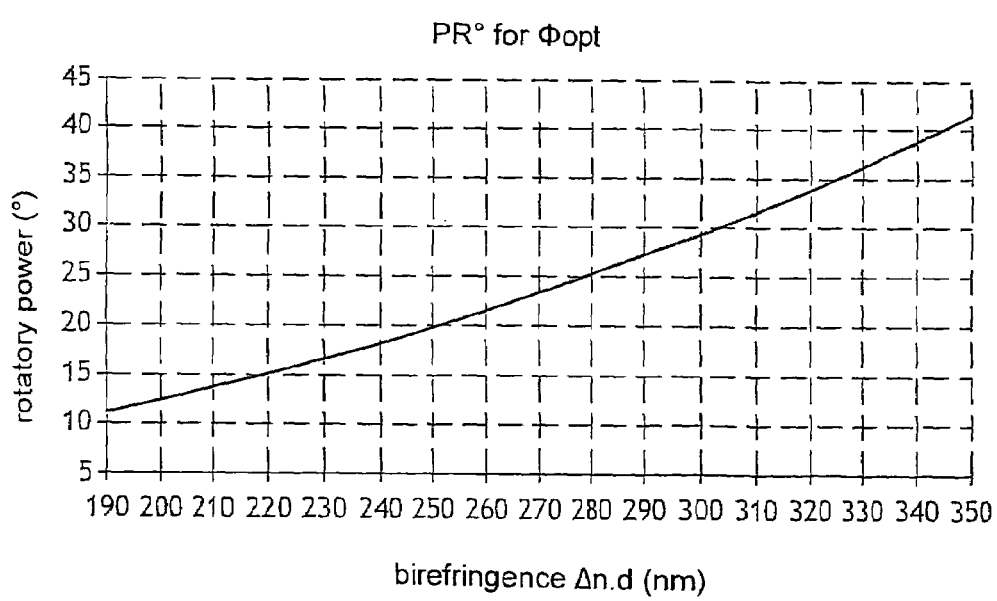
FIG. 4 represents the rotatory power as a function of the optical delay for a free parameter φ.

From the fixed values of Δnd and $\lambda_0$ ($\lambda_0$ being a chosen wavelength in the visible spectrum, for example 550 nm), $\phi_T = \phi_{opt}$ is determined from formula [6], then the exact value of the rotatory power PR is calculated with formula [3]. The value of the rotatory power PR as a function of the cell delay is given in FIG. 4. It is noted that for a delay of between 190 nm and 320 nm, PR varies between 10° and 35°.

In order to obtain a black, an orientation A of the analyser 10 perpendicular to the output polarization Pout (Formula[5]) is required:

i.e. $A = P + PR \pm \pi/2$

Investigation of the Best White

A (or β) is replaced by its value as a function of P (or α) in the transmission formula as in formula [1], with $\phi_U = \phi_T + \pi$ The only remaining variable is P (or α). The value of P (or α) is sought which produces the highest value of T. Once P is determined, the value of A is obtained using formula [5].

Calculation Example—Improvement of the Black State.

Starting with these considerations, it appears that a reduction in the delay Δnd of the cell with respect to the value recommended by the prior art makes it possible to improve very clearly the quality of the black, the price to be paid being a loss with respect to the passing-state (white).

Table 2, attached, shows several theoretical sets of parameters of the cell optimized in order to obtain the best black on the visible spectrum, and calculated according to the process described previously.

For the case Δnd=193 nm, it is seen that the contrast has been multiplied by 3 with respect to the conventional solution of Table 1 (state of the art), at the cost of a loss of 20% with respect to the white state.

The respective transmissions of the white and black states obtained for the case Δnd=193 nm described in Table 2 are given in FIG. 5 as a function of the wavelength. The spectrum of the black is very much improved in the blue, at the cost of a less "flat" white state which will be slightly bluish.

However, the values given in Table 2 correspond to theoretical values. In practice the industrial manufacturing processes of liquid crystal cells impose constraints on the real anchorings and twist which must be taken into account.

Taking Account of the Constraint φ Imposed

Figure 6:
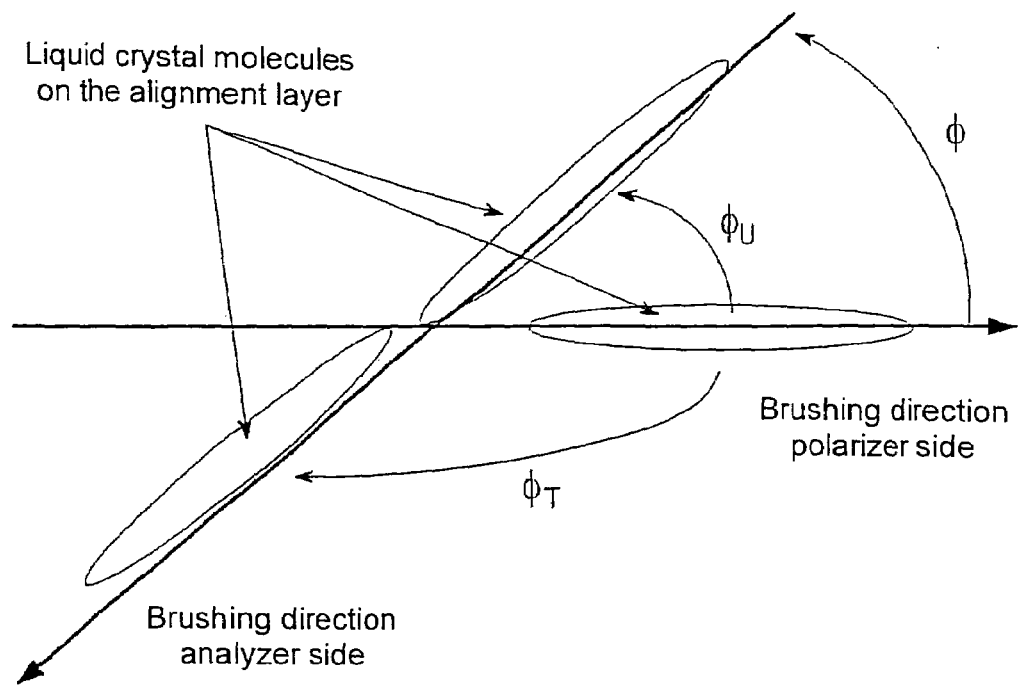

In the practical case of an infinitely strong azimuthal anchoring the director 22, 32 on each face 20, 30 of the cell is determined by the brushing direction of the alignment layer (for example of polyimide chemical type) used on this face. Actually, for an infinitely strong azimuthal anchoring the director of the liquid crystal alignes parallel to the brushing direction (see FIG. 6). In this case, a precise value of φ is obtained by fixing the brushing directions of the two alignment layers on the production machine of the display, so that they form an angle φ between themselves.

As regards questions of mounting convenience or satisfactory operation of the cell, the angles of the brushing directions of the cell can be imposed, which therefore imposes $\phi_U$ and $\phi_T$. In this case, the calculation of the best configuration for P and A according to the criterion: "best black without too many losses with respect to the white", is not easy with an analytical formula such as [1]. The process proposed by the inventors makes it possible to carry out the calculation more easily.

The rotatory power is calculated for the value of $\phi_T$ imposed, then as previously the value of A as a function of P following from formula [5] is introduced into formula [1] for $\phi_U$ imposed, and the values of P which maximize the transmission are sought.

Examples of Calculation with φ Imposed

The following are taken as examples: $\phi_T = -\pi$ i.e. $\phi_U = 0°$ (antiparallel brushing directions) and λ=550 nm.

In this case, α=P and β=A.

Figure 7:
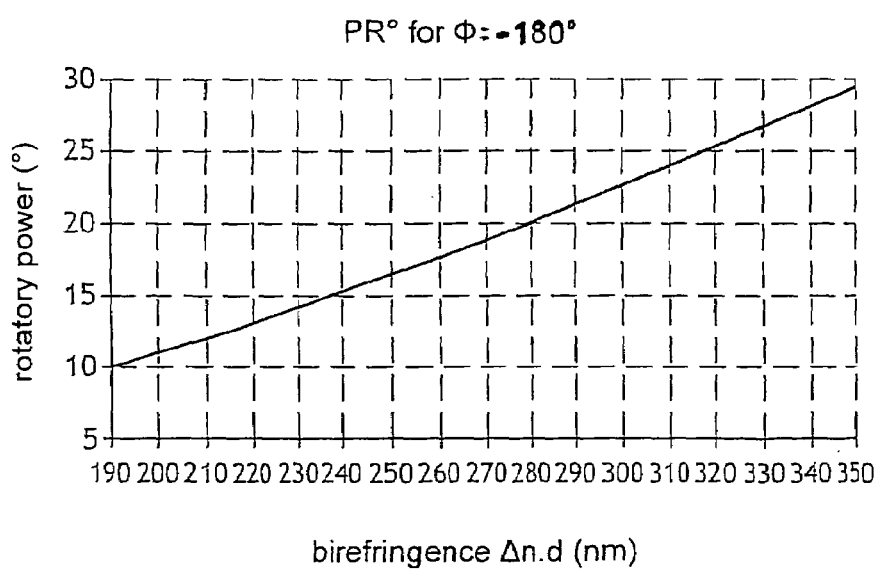
FIG. 7 represents the rotatory power as a function of the optical delay for an imposed parameter φ.

The calculated value of the rotatory power as a function of the cell delay is given in FIG. 7. By comparison with FIG. 4 where φ is optimal, it is seen that PR essentially depends in first approximation on the delay, and also on the value of φ.

EXAMPLE 1

Δnd=275 nm

Figure 8:
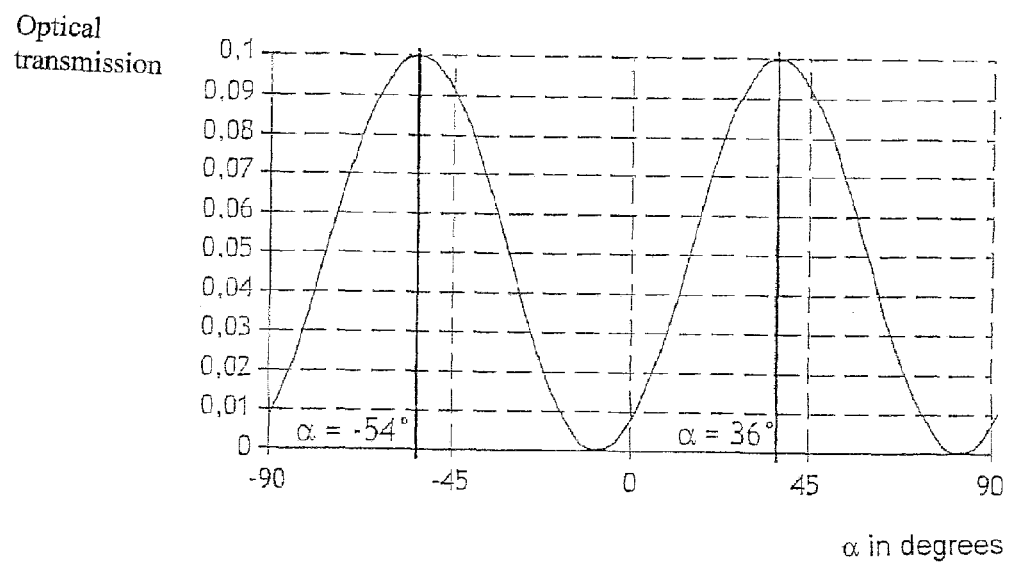
FIG. 8 represents the optical transmission of the configuration (Δnd=275 mm, φ imposed at φu=0° and φT=−180°) described in Table 3 as a function of α.

It is calculated that PR=19.2° and, β=α+PR±π/2.
The transmission T calculated for $\phi_U$=0° is given in FIG. 8.
The values of α which give the maximal value of T are (see FIG. 8):

α=−54° hence β=55°

α=36° hence β=−35°

These two configurations are equivalent.
The optical transmissions of the white and black states are given in FIG. 9. The performances of this configuration are given in Table 3.

EXAMPLE 2

Δnd=193 nm

In the same manner as for example 1, it is calculated:

PR=10.17°

α=−50° hence β=55°

α=40° hence β=−40°.

The optical transmissions of the white and black states are given in FIG. 10. The performances of this configuration are given in Table 3.

For these two delay cases, the same tendencies are found for φ imposed, as for φ free: a better black for 193 nm at the cost of a less luminous and less "flat" white.

Real Case of a Finite Azimuthal Anchoring

Figure 11:
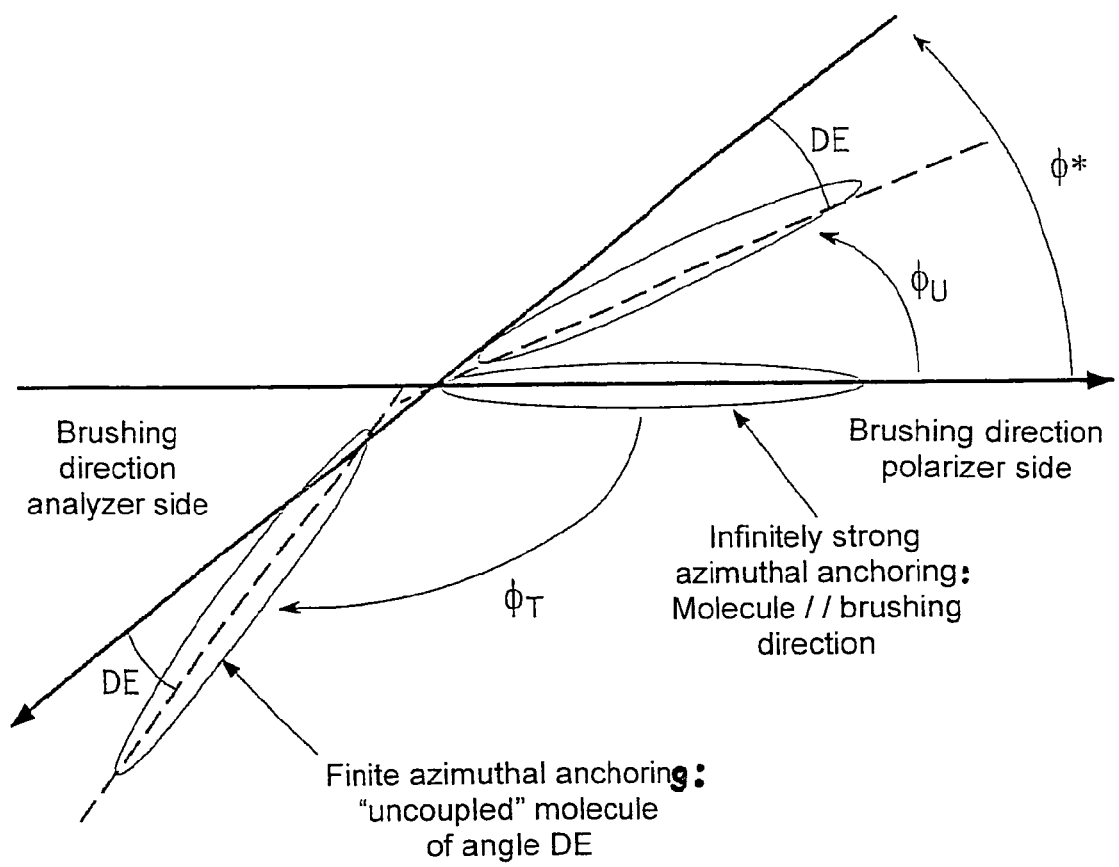

When the azimuthal anchoring is finite (not infinitely strong), the elastic forces which act on the molecules close to the surface due to the chiral doping of the liquid crystal mixture, make these molecules "uncouple", i.e. the director of the liquid crystal is no longer strictly parallel to the brushing direction, but shifted by an angle DE called "elastic uncoupling". In order to simplify the illustration, it is assumed that a single anchoring layer has a finite azimuthal anchoring, the other layer having an infinitely strong azimuthal anchoring. The uncoupling moves in the direction of reducing the absolute value of the twist of low value $\phi_U$, which becomes, for example, $\phi_U$–DE for $\phi_U$>0, and of reducing the absolute value of the twist of high value $\phi_T$, which becomes, for example, $\phi_T$+DE for $\phi_T$<0 (see FIG. 11).

The angle formed by the brushing directions between themselves is called $\phi^*$.

Due to the uncoupling we have:

$$\phi_T - \phi_U = -\pi + 2.DE$$

The elastic uncoupling is directly connected to the azimuthal anchoring force characterized by its extrapolation length Laz according to the relationship:

$$DE = \frac{\pi \cdot L_{az}}{2d}$$

A finite azimuthal anchoring typically has a Laz of the order of 100 to 200 nm, i.e. DE comprised between a few degrees and approximately 15°. The parameter DE is a physical parameter which can be measured experimentally, and therefore assumed to be known.

The inventors have chosen for the following examples values of DE of 5° and 10°.

Case Where the Parameter $\phi^*$ is Free

The optimal values of $\phi^*$ will now be calculated as a function of the uncoupling DE, as well as the corresponding optical configuration.

For each delay $\Delta nd$ the optimal value of the high twist as defined by the formula [6] is called $\phi_{opt}$.

The effective value of the high twist $\phi_T$ is (cf FIG. 11):

$$\phi_T = -\pi + \phi^* + DE$$

One wants $\phi_T = \phi_{opt}$ hence $$\phi^* = \pi + \phi_{opt} - DE$$

The rotatory power is calculated for ($\Delta nd$, $\phi_{opt}$), then the relationship between A and P is introduced into the formula [1] for $\phi_U = \phi^* - DE$, and the values of P which maximize the transmission are sought graphically.

Example of Calculation with $\Delta nd$=193 nm

The value of $\phi_{opt}$ is in this case –168.5°, corresponding to a rotatory power of 11.5°.

The calculations and performances of the optimized configuration corresponding to each uncoupling value are given in Table 4.

Performances are found which are close to those of Table 2, which is to be expected as, in both cases, it is possible to configure the cell such that $\phi_T$ is equal to $\phi$ optimum, which guarantees a good black.

Example of Calculation with $\Delta nd$=275 nm

The value of $\phi_{opt}$ is in this case –156°, corresponding to a rotatory power of 24°.

The calculations and performances of the optimized configuration corresponding to each uncoupling value are given in Table 5.

Because of the higher delay, the contrast is less good, but it retains a correct value (>200) as it is possible to configure the cell so that $\phi_T$ is equal to $\phi$ optimum.

Case Where the Parameter $\phi^*$ is Imposed

The brushing direction of the cells $\phi^*$ can be imposed, for example by the industrial process.

The effective value of $\phi_T$ in this case is (cf FIG. 11):

$$\phi_T = -\pi + \phi^* + DE$$

The rotatory power is calculated for the corresponding value of $\phi_T$, then, as previously, the value of A as a function of P resulting from formula [5] is introduced into formula [1] for $\phi_U = \phi^* - DE$ and the values of P which maximize the transmission are sought. The results for the delay values 193 nm and 275 nm are given in Tables 6 and 7 for the case $\phi^*$ imposed equal to 0°.

The effect of elastic uncoupling diminishes the value of the twist of high value $\phi_T$, which brings $\phi_T$ closer to the value $\phi_{opt}$ (–168.5° for the case 193 nm and –156° for 275 nm). The contrast therefore improves when the uncoupling increases. For 193 nm and DE=10°, it is almost $\phi_{opt}$, and the contrast value obtained, 896, is therefore very close to the value obtained with $\phi_{opt}$ (916).

VARIANTS OF THE INVENTION

The configurations calculated for the transmissive mode are applicable to the transflective or reflective modes. The angles calculated are identical, only the nature of the polarizer 40 on the source side P differs according to the mode.

These modes favour the black, and thus have a non-optimized white in terms of brilliance.

In order to slightly modify the colorimetry of the white, the positions of the polarizers 40 and 10 can be adjusted in the vicinity of their calculated position, on condition that the relationship between them (given by the rotatory power) which guarantees the best black is respected.

The rotatory power PR is function of the twist $\phi$ (close to $\pi$) and the cell delay. The angles between P and A which depend on the value of PR are therefore to a large extent dependent on the delay value of the cell.

TABLE 1 transmissive optical mode of a cell [Φ; Φ – π] according to the state of the art (Document [4] US 2003/0076455)

| $\Phi_U$ | $\Phi_T = \Phi_U - \pi$ | $\Delta nd$ | P | A | Lblack $\Phi_T = \Phi_U - \pi$ | Lwhite $\Phi_U$ | CR |
|---|---|---|---|---|---|---|---|
| 22.5° | –157.5° | 266 nm | –45° 45° | +67.5° –22.5° | 0.0031 | 0.988 | 317 |

TABLE 2 example of solutions allowing an improvement of the black state

| $\Delta nd$ | $\Phi_U$ | $\Phi_T = \Phi_U - \pi$ opt | P | A | Lblack $\Phi_T = \Phi_U - \pi$ | Lwhite $\Phi_U$ | CR |
|---|---|---|---|---|---|---|---|
| 220 nm | 15° | –165° | –45° 45° | 60° –30° | 0.0015 | 0.90 | 623 |
| 193 nm | 11.5° | –168.5° | –45° 45° | 56.5° –33.5° | 0.00087 | 0.8 | 916 |

TABLE 3 examples of solutions optimizing the black state
with a twist imposed at −π

| Δnd | $\Phi_U$ | $\Phi_T = \Phi_U - \pi$ imposed | P | A | Lblack $\Phi_T = \Phi_U - \pi$ | Lwhite $\Phi_U$ | CR |
|---|---|---|---|---|---|---|---|
| 275 nm | 0° | −180° | −54° 36° | 55° −35° | 0.028 | 0.987 | 35 |
| 193 nm | 0° | −180° | −50° 40° | 50° −40° | 0.0044 | 0.787 | 178 |

TABLE 4 example of solutions for different elastic uncoupling values for
(Δnd = 193 nm; $\Phi_{opt}$ = −168.5°; λ = 550 nm)

| DE | $\Phi^*$ | $\Phi_U$ | P | A | Lblack $\Phi_T$ | Lwhite $\Phi_U$ | CR |
|---|---|---|---|---|---|---|---|
| 5° | 6.5° | 1.5° | −50° 40° | 52.5° −38.5° | 0.00087 | 0.80 | 918 |
| 10° | 1.5° | −3.5° | −52° 38° | 49.5° −40.5° | 0.00086 | 0.79 | 919 |

TABLE 5 example of solutions for different elastic uncoupling values for
(Δnd = 275 nm; $\Phi_{opt}$ = −156°; λ = 550 nm)

| DE | $\Phi^*$ | $\Phi_U$ | P | A | Lblack $\Phi_T$ | Lwhite $\Phi_U$ | CR |
|---|---|---|---|---|---|---|---|
| 5° | 19° | 14° | −51° 40° | 63° −25° | 0.0035 | 0.984 | 282 |
| 10° | 14° | 9° | −52° 38° | 62° −28° | 0.0034 | 0.986 | 285 |

TABLE 6 example of solutions for different elastic uncoupling values for
(Δnd = 193 nm; λ = 550 nm) with $\Phi^*$ imposed at 0°.

| DE | $\Phi^*$ | $\Phi_U$ | P | A | Lblack $\Phi_T$ | Lwhite $\Phi_U$ | CR |
|---|---|---|---|---|---|---|---|
| 5° | 0° | −5° | −52° 38° | 48.5° −41.5° | 0.0020 | 0.789 | 399 |
| 10° | 0° | −10° | −55.5° 34.5° | 45.5° −44.5° | 0.0009 | 0.781 | 896 |

TABLE 7 example of solutions for different elastic uncoupling values for
(Δnd = 275 nm; λ = 550 nm) with $\Phi^*$ imposed at 0°.

| DE | $\Phi^*$ | $\Phi_U$ | P | A | Lblack $\Phi_T$ | Lwhite $\Phi_U$ | CR |
|---|---|---|---|---|---|---|---|
| 5° | 0° | −5° | −56.5° 33.5° | 53.5° −36.5° | 0.019 | 0.99 | 51 |
| 10° | 0° | −10° | −60.5° 29.5° | 50.5° −39.5° | 0.011 | 0.99 | 87 |

The values given in the above tables correspond to a levo-rotatory texture.

The invention is of course valid when the liquid crystal is dextro-rotatory. Such a dextro-rotatory texture reverses the respective signs of $\phi_U$ and $\phi_T$, and of the rotatory power PR.

In this case, the equivalent configurations are obtained by reversing the signs of $\phi_U$ and $\phi_T$ and PR. The optimal orientations of the polarizer 40 and analyser 10 are obtained by reversing the signs of the P's and the A's. By way of example, the dextro-rotatory values corresponding to Tables 5, 6 and 7 of the levo-rotatory case are given below, in Tables 8, 9 and 10 respectively:

TABLE 8 example of solutions for different elastic uncoupling values for
(Δnd = 275 nm; $\Phi_{opt}$ = 156°; λ = 550 nm) - case
of a dextro-rotatory liquid crystal

| DE | $\Phi^*$ | $\Phi_U$ | P | A | Lblack $\Phi_T$ | Lwhite $\Phi_U$ | CR |
|---|---|---|---|---|---|---|---|
| 5° | −19° | −14° | 51° −40° | −63° 26° | 0.0035 | 0.984 | 282 |
| 10° | −14° | −9° | 52° −38° | −62° 28° | 0.0034 | 0.986 | 285 |

TABLE 9 example of solutions for different elastic uncoupling values for
(Δnd = 193 nm; λ = 550 nm) with $\Phi^*$ imposed at
0°- case of a dextro-rotatory liquid crystal.

| DE | $\Phi^*$ | $\Phi_U$ | P | A | Lblack $\Phi_T$ | Lwhite $\Phi_U$ | CR |
|---|---|---|---|---|---|---|---|
| 5° | 0° | 5° | 52° −38° | −48.5° 41.5° | 0.0020 | 0.789 | 399 |
| 10° | 0° | 10° | 55.5° −34.5° | −45.5° 44.5° | 0.0009 | 0.781 | 896 |

TABLE 10 example of solutions for different elastic uncoupling values for
(Δnd = 275 nm; λ = 550 nm) with $\Phi^*$ imposed
at 0°- case of a dextro-rotatory liquid crystal.

| DE | $\Phi^*$ | $\Phi_U$ | P | A | Lblack $\Phi_T$ | Lwhite $\Phi_U$ | CR |
|---|---|---|---|---|---|---|---|
| 5° | 0° | 5° | 56.5° −33.5° | −53.5° 36.5° | 0.019 | 0.99 | 51 |
| 10° | 0° | 10° | 60.5° −29.5° | −50.5° 39.5° | 0.011 | 0.99 | 87 |

REFERENCES

Document [1]: patent FR-A-2 740 894
Document [2]: "Fast bistable nematic display using monostable surface anchoring switching" Proceeding SID 1997, p 41-44
Document [3]: "Recents improvements of bistable nematic displays switched by anchoring breaking" SPIE vol. 3015 (1997), p 61-69
Document [4]: patent US 2003/0076455
Document [5]: "Dynamic flow, broken surface anchoring, and switching bistability in three-terminal twisted nematic liquid crystal displays" Journal of Applied Physics, vol 90, no. 6, p 3121-3123 (2001)
Document [6]: "Three terminal bistable twisted nematic liquid crystal displays", Applied Physics letters, vol 77, no. 23, p 3716-3718, December 2000
Document [7]: H. L. Ong "Origin and characteristics of the optical properties of general twisted nematic liquid crystal displays" J. Appl. Phys. 64, 614 (1988)

Document [8]: P. Yeh and C. Gu "Optics of liquid crystal displays", Wiley, N.Y., 1999

Document [9]: Poincare H., Théorie mathématique de la lumière, Gauthiers Villars (1889)

Document [10]: Schurcliff W. A. "Polarized light, production and use" Harvard University Press (1966)

The invention claimed is:

1. A nematic liquid crystal display device presenting two stable states, without an electric field, that are obtained by anchoring break, the two stable states corresponding to two textures of liquid crystal molecules, the twisting of which differs by 150° to 180° in absolute values, wherein said nematic liquid crystal device comprises two polarizers (10, 40), the first polarizer (10) being placed on the side of the observer, the other polarizer (40) being placed on the opposite face of the liquid crystal cell, the orientation of the two polarizers being shifted by a value equal to the rotatory power of the cell +/−Π/2, the rotatory power corresponding to the effect of the most twisted texture.

2. The device according to claim 1, wherein the optical delay Δnd is of the order of 240 +/−80 nm.

3. The device according to claim 1, wherein orientation of the polarizer placed on the opposite side with respect to the observer, as referring to the nematic director on the associated face of the cell, is comprised within the range containing the sub-range +/−20° to 70°, whilst the orientation of the polarizer placed on the side of the observer, as referring to the same nematic director reference, is comprised within the range comprising the sub-range from +/−20° to 70°.

4. The device according to claim 1, wherein, for a levorotatory liquid crystal, the orientation of the polarizer placed on the opposite side with respect to the observer is comprised within the range comprising the sub-ranges −70° to −40° and 20° to 55°, whilst the orientation of the polarizer placed on the side of the observer is comprised within the range comprising the sub-ranges −55° to −20° and 35° to 70°, and for a dextrorotatory liquid crystal, the orientation of the polarizer placed on the opposite side with respect to the observer is comprised within the range comprising the sub-ranges −55° to −20° and 40° to 70°, whilst the orientation of the polarizer placed on the side of the observer is comprised within the range comprising the sub-ranges −70° to −35° and 20° to 55°.

5. The device according to claim 1, wherein the twist angle of the molecules in one of the two stable states is comprised between 0° and 15°.

6. The device according to claim 1, wherein the twist angle of the molecules in one of the two stable states is comprised between 0° and 15°, the optical delay Δnd=200+/−40 nm, and for a levorotatory liquid crystal, the orientation of the polarizer on the opposite side with respect to the observer is comprised within the range [−60°; −40°] U [30°; 50°], whilst the orientation of the polarizer on the side of the observer is comprised within the range [−50°; −25°] U [40°; 70°].

7. The device according to claim 1, wherein the twist angle of the molecules in one of the two stable states is comprised between 0° and 15°, the optical delay Δnd=200+/−40 nm, and for a dextrorotatory liquid crystal, the orientation of the polarizer on the opposite side with respect to the observer is comprised within the range [−50°; −30°] U [40°; 60°], whilst the orientation of the polarizer on the side of the observer is comprised within the range [−70°; −40°] U [25°; 50°].

8. The device according to claim 1, wherein the twist angle of the molecules in one of the two stable states is comprised between 0° and 15°, the optical delay Δnd=280+/−40 nm, and for a levorotatory liquid crystal, the orientation of the polarizer on the opposite side with respect to the observer is comprised within the range [−65°; −45°] U [25°; 50°], whilst the orientation of the polarizer on the side of the observer is comprised within the range [−50°; −20°] U [40°; 70°].

9. The device according to claim 1, wherein the twist angle of the molecules in one of the two stable states is comprised between 0° and 15°, the optical delay Δnd=280+/−40 nm, and for a dextro-rotatory liquid crystal, the orientation of the polarizer on the opposite side with respect to the observer is comprised within the range [−50°; −25°] U [45°; 65°], whilst the orientation of the polarizer on the side of the observer is comprised within the range [−70°; −40°] U [20°; 50°].

10. The device according to claim 1, wherein the angle formed by brushing directions between themselves is comprised between 10° and 15°, the optical delay Δnd=200+/−40 nm, and for a levo-rotatory liquid crystal, the orientation of the polarizer on the opposite side with respect to the observer is comprised within the range [−55°; −35°] U [35°; 55°], whilst the orientation of the polarizer on the side of the observer is comprised within the range [−45°; −25°] U [45°; 70°].

11. The device according to claim 10, wherein the orientation of the polarizer on the opposite side with respect to the observer is comprised within the range [−40°; −50°] U [40°; 50°], whilst the orientation of the polarizer on the side of the observer is comprised within the range [−45°; −25°] U [50°; 65°].

12. The device according to claim 1, wherein the angle formed by brushing directions between themselves is comprised between 10° and 15°, the optical delay Δnd=200+/−40 nm, and for a dextro-rotatory liquid crystal, the orientation of the polarizer on the opposite side with respect to the observer is comprised within the range [−35°; −55°] U [35°; 55°], whilst the orientation of the polarizer on the side of the observer is comprised within the range [−70°; −45°] U [25°; 45°].

13. The device according to claim 12, wherein for the dextrorotatory liquid crystal, the orientation of the polarizer on the opposite side with respect to the observer is comprised within the range [−40°; −50°] U [40°; 55°], whilst the orientation of the polarizer on the side of the observer is comprised within the range [−65°; −50°] U [25°; 45°].

14. The device according to claim 1, wherein the angle formed by brushing directions between themselves is comprised between 0° and 10°, the optical delay Δnd=200+/−40 nm, and for a levorotatory liquid crystal, the orientation of the polarizer on the opposite side with respect to the observer is comprised within the range [−65°; −40°] U [25°; 50°], whilst the orientation of the polarizer on the side of the observer is comprised within the range [−55°; −25°] U [35°; 65°].

15. The device according to claim 14, wherein for the levorotatory liquid crystal, the orientation of the polarizer on the opposite side with respect to the observer is comprised within the range [−60°; −45°] U [30°; 45°], whilst the orientation of the polarizer on the side of the observer is comprised within the range [−50°; −30°] U [40°; 60°].

16. The device according to claim 1, wherein the angle formed by the brushing directions between themselves is comprised between 0° and 10°, the optical delay Δnd=200+/−40 nm, and for a dextro-rotatory liquid crystal, the orientation of the polarizer on the opposite side with respect to the observer is comprised within the range [−50°; −25°] U [40°; 65°], whilst the orientation of the polarizer on the side of the observer is comprised within the range [−65°; −35°] U [25°; 55°].

17. The device according to claim 16, wherein for the dextrorotatory liquid crystal, the orientation of the polarizer on the opposite side with respect to the observer is comprised within the range [−45°; −30°] U [45°; 60°], whilst the orientation of the polarizer on the side of the observer is comprised within the range [−60°; −40°] U [30°; 50°].

18. The device according to claim 1, wherein the angle formed by brushing directions between themselves is comprised between 0° and 5°, the optical delay Δnd=200+/−40 nm, and for a levo-rotatory liquid crystal, the orientation of the polarizer on the opposite side with respect to the observer is comprised within the range [−70°; −45°] U [20°; 45°], whilst the orientation of the polarizer on the side of the observer is comprised within the range [−50°; −25°] U [40°; 65°].

19. The device according to claim 18, wherein for the levo-rotatory liquid crystal, the orientation of the polarizer on the opposite side with respect to the observer is comprised within the range [−65°; −50°] U [25°; 40°], whilst the orientation of the polarizer on the side of the observer is comprised within the range [−45°; −30°] U [45°; 60°].

20. The device according to claim 1, wherein the angle formed by brushing directions between themselves is comprised between 0° and 5°, the optical delay Δnd=280+/−40 nm, and for a dextrorotatory liquid crystal, the orientation of the polarizer on the opposite side with respect to the observer is comprised within the range [−45°; −20°] U [45°; 70°], whilst the orientation of the polarizer on the side of the observer is comprised within the range [−65°; −40°] U [25°; 50°].

21. The device according to claim 20, wherein for the dextro-rotatory liquid crystal, the orientation of the polarizer on the opposite side with respect to the observer is comprised within the range [−40°; −25°] U [50°; 65°], whilst the orientation of the polarizer on the side of the observer is comprised within the range [−60°; −45°] U [30°; 45°].

22. The device according to claim 1, wherein the ratio between the thickness d of the cell and the spontaneous pitch $p_0$, of the liquid crystal molecules, is approximately equal to 0.25+/−0.1 or 0.25±0.05.

23. A method for the optimization of the orientation of two polarizers (10, 40) in a nematic liquid crystal display device presenting two stable states, without an electric field, that are obtained by anchoring break, the two stable states corresponding to two textures of liquid crystal molecules, the twisting of which differs by 150° to 180° in absolute values, said method comprises the steps consisting of calculating the rotatory power of the cell and positioning the two polarizers (10, 40), the first polarizer(10) being placed on the side of the observer, the other polarizer (40) being placed on the opposite face of the liquid crystal cell, according to an orientation shifted by a value equal to the rotatory power of the cell +/− Π/2, the rotatory power corresponding to the effect of the most twisted texture.

24. The method according to claim 23, wherein the rotatory power PR is calculated on the basis of the relationship:

$$PR \cong \phi - \arctg\left(\frac{\phi}{X}tgX\right) \quad [3]$$

with $$X(\phi, \lambda) = \sqrt{\phi^2 + \left(\frac{\pi \Delta nd}{\lambda}\right)^2}. \quad [2]$$

25. The method according to claim 23, which comprises the steps consisting of:
calculating the rotatory power PR using a formula which utilizes the optical delay Δnd, the twist Φ and the wavelength λ,
fixing the orientation A of the output polarizer (10) equal to P+PR +/−Π/2, P representing the orientation of the polarizer (40) on the side opposite to the observer and PR the rotatory power,
researching the values of P which produce the highest resultant transmission value for a twist value equal to Φ+/−Π in the case of infinite azimuthal anchoring or a twist value equal to Φ+/−Π−2.DE taking account of the elastic uncoupling, and
deducing A from it.

26. The method according to claim 23, wherein the transmission value is defined by the relationship:

$$Tas(\phi, \lambda) = \cos^2(\alpha + \beta) - \cos^2 X \cos 2\alpha \cos 2\beta \left[\frac{\phi}{X}\tan X - \tan 2\alpha\right]\left[\frac{\phi}{X}\tan X + \tan 2\beta\right].$$

27. The method according to claim 23, wherein the rotatory power PR is calculated on the basis of an optimal twist value Φopt determined on the basis of the relationship:

$$\phi_{opt} = \pi\sqrt{1 - \left(\frac{\Delta nd}{\lambda_0}\right)^2}. \quad [6]$$

28. The method according to claim 23, wherein the rotatory power PR is calculated on the basis of a twist value imposed by the azimuthal anchoring.

29. The method according to claim 23, which comprises a step of adaptation of the angles of the polarizers in order to improve the colorimetric neutrality of the white obtained.

30. The method according to claim 23, wherein the rotatory power PR is calculated on the basis of a twist value which integrates an uncoupling (DE) resulting from a finite azimuthal anchoring.

* * * * *

UNITED STATES PATENT AND TRADEMARK OFFICE
CERTIFICATE OF CORRECTION

PATENT NO. : 7,589,816 B2
APPLICATION NO. : 10/580319
DATED : September 15, 2009
INVENTOR(S) : Joubert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Twenty-first Day of September, 2010

David J. Kappos
*Director of the United States Patent and Trademark Office*